(12) United States Patent
Schwarz et al.

(10) Patent No.: US 9,193,233 B2
(45) Date of Patent: Nov. 24, 2015

(54) ARTICULATED HITCH COUPLER

(71) Applicant: Bruno Independent Living Aids, Inc., Oconomowoc, WI (US)

(72) Inventors: Timothy G. Schwarz, Delafield, WI (US); Adam C. Hooper, Iron Ridge, WI (US); Mark D. Dees, Glendale, AZ (US)

(73) Assignee: Bruno Independent Living Aids, Inc., Oconomowoc, WI (US)

( * ) Notice: Subject to any disclaimer, the term of this patent is extended or adjusted under 35 U.S.C. 154(b) by 0 days.

(21) Appl. No.: 14/212,578

(22) Filed: Mar. 14, 2014

(65) Prior Publication Data
US 2014/0265251 A1    Sep. 18, 2014

Related U.S. Application Data

(60) Provisional application No. 61/794,249, filed on Mar. 15, 2013, provisional application No. 61/792,565, filed on Mar. 15, 2013.

(51) Int. Cl.
*B60D 1/46*  (2006.01)
*B60D 1/42*  (2006.01)
*B60D 1/167* (2006.01)
*B60D 1/173* (2006.01)

(52) U.S. Cl.
CPC ....... *B60D 1/42* (2013.01); *B60D 1/167* (2013.01); *B60D 1/46* (2013.01); *B60D 1/173* (2013.01)

(58) Field of Classification Search
CPC ........... B60D 1/46; B60D 1/167; B60D 1/173

USPC ..................... 280/490.1, 488, 499
See application file for complete search history.

(56) References Cited

U.S. PATENT DOCUMENTS

| | | | |
|---|---|---|---|
| 3,918,744 A * | 11/1975 | Gay ................... | 280/418.1 |
| 4,108,089 A | 8/1978 | van der Lely | |
| 4,216,975 A | 8/1980 | Schafer | |
| 4,236,586 A | 12/1980 | Shader et al. | |
| 4,598,926 A | 7/1986 | Gallatin | |
| 4,775,013 A | 10/1988 | van der Lely | |
| 4,949,987 A | 8/1990 | Gallatin | |
| 5,346,018 A | 9/1994 | Koster | |
| 5,664,796 A | 9/1997 | Huyzers | |
| 5,918,451 A | 7/1999 | Vonesch | |
| 5,934,698 A | 8/1999 | Despain | |
| 5,947,385 A | 9/1999 | Lanerd et al. | |
| 6,238,170 B1 | 5/2001 | Pingry et al. | |
| 6,692,215 B1 | 2/2004 | Panzarella et al. | |
| 7,125,036 B2 | 10/2006 | Moss et al. | |
| 7,195,268 B1 | 3/2007 | Williams, Jr. | |
| 7,219,915 B2 * | 5/2007 | Christensen ............ | 280/490.1 |
| 7,255,362 B2 | 8/2007 | Smith | |
| 7,370,460 B1 | 5/2008 | Philips et al. | |
| 7,686,562 B2 | 3/2010 | Panzarella et al. | |
| 7,832,745 B2 | 11/2010 | Rauch, Jr. | |
| 7,900,949 B1 * | 3/2011 | Russell, Jr. ........... | 280/477 |
| 8,172,248 B2 | 5/2012 | Groves | |

(Continued)

*Primary Examiner* — Kevin Hurley
*Assistant Examiner* — Marlon Arce
(74) *Attorney, Agent, or Firm* — Setter Roche LLP

(57) ABSTRACT

An articulated coupler permits vertical displacement of a towed vehicle relative to a towing vehicle while preventing lateral or horizontal displacement of the towed vehicle relative to the towing vehicle. Multiple linkage arms provide coupling for special configuration towed vehicles such as short wheel-mounted lifts that experience torsional forces due to the presence and absence of loads on the lift.

14 Claims, 15 Drawing Sheets

(56) References Cited

U.S. PATENT DOCUMENTS

| | | |
|---|---|---|
| 8,234,847 B2 | 8/2012 | Fox et al. |
| 8,246,072 B2 | 8/2012 | Groppo |
| 8,286,574 B2 | 10/2012 | Müller |
| 8,328,222 B1 | 12/2012 | Roeber et al. |
| 8,342,559 B1 | 1/2013 | MacKarvich |
| 8,356,831 B2 | 1/2013 | Pollock et al. |
| 8,366,136 B2 | 2/2013 | Svihla |
| 8,678,737 B2 | 3/2014 | DiGiovanni et al. |
| 2003/0178811 A1* | 9/2003 | Buckner ................ 280/483 |
| 2012/0151892 A1* | 6/2012 | Clark et al. ............. 56/15.7 |

\* cited by examiner

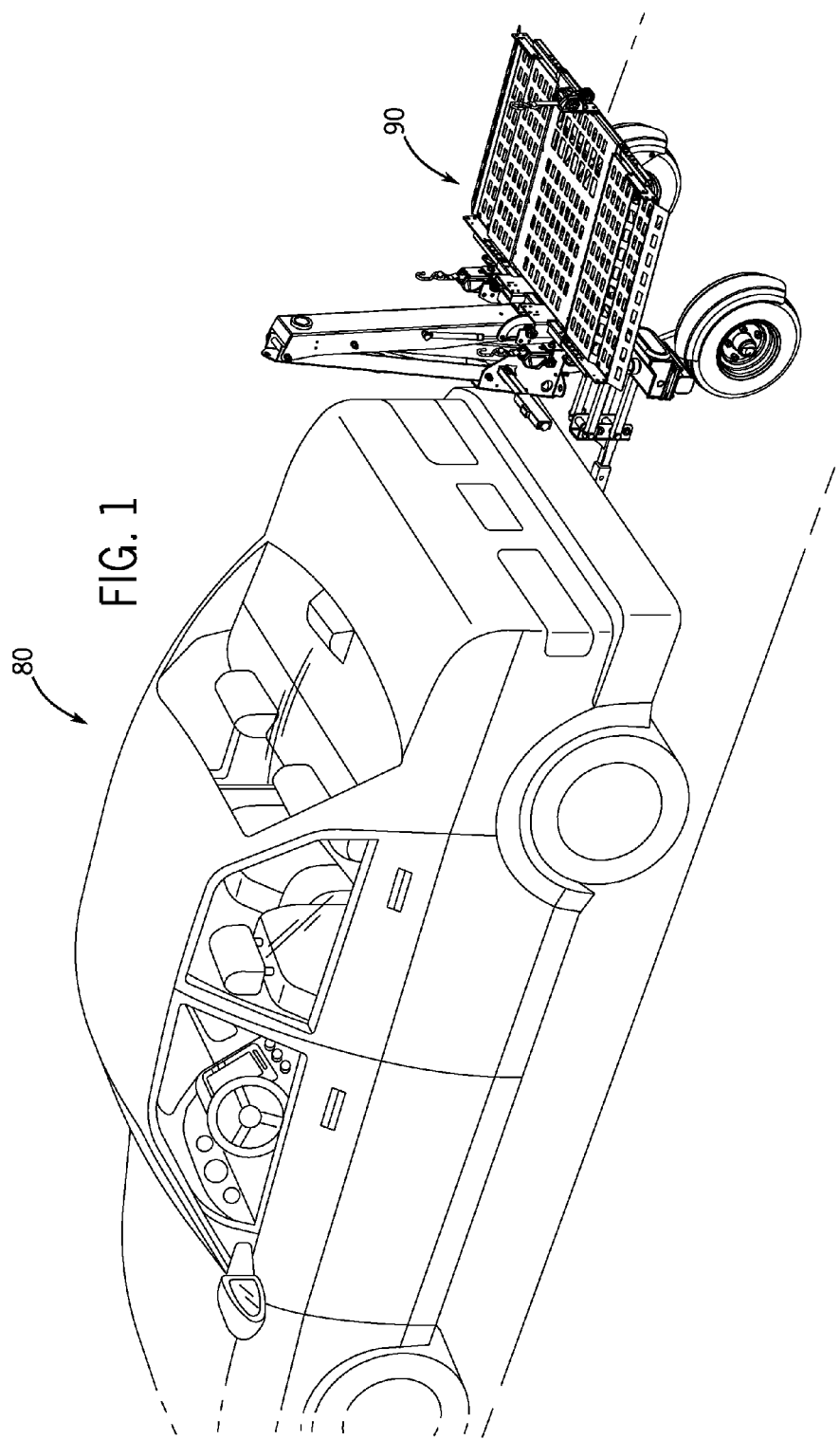

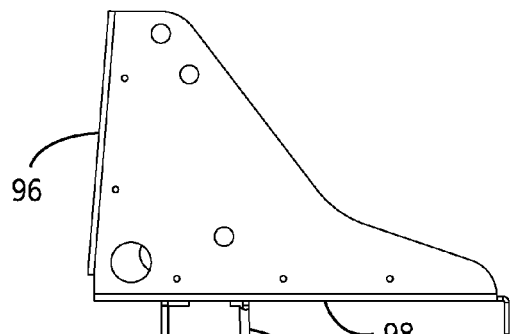
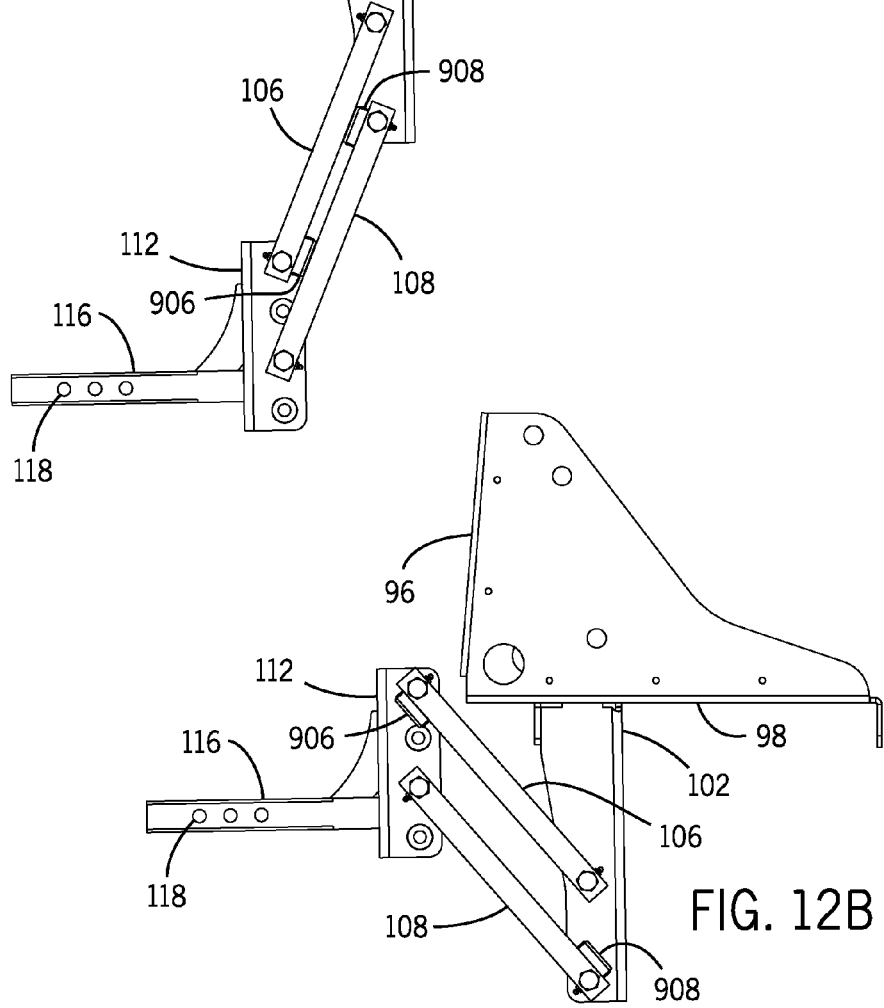
FIG. 12A
FIG. 12B

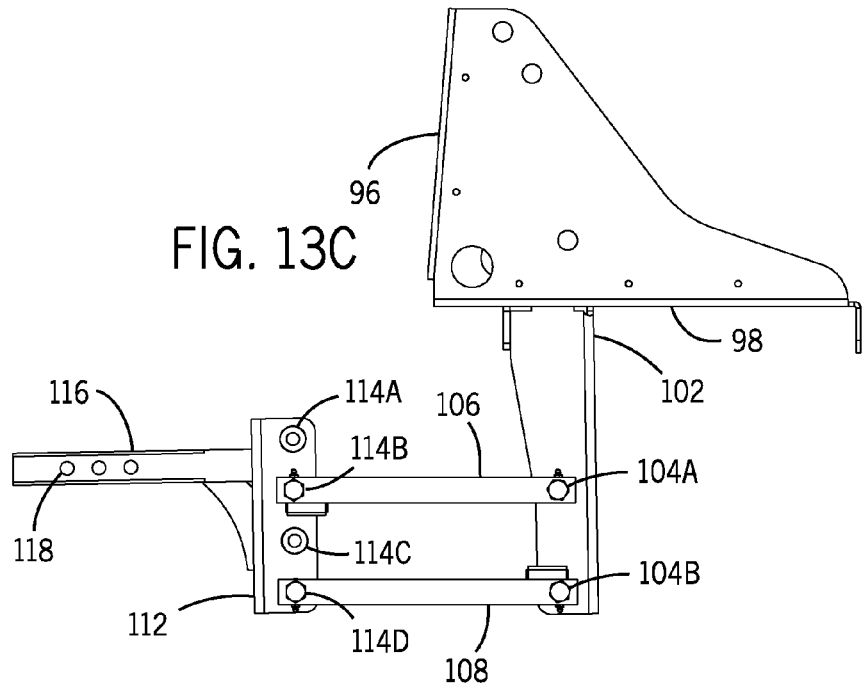
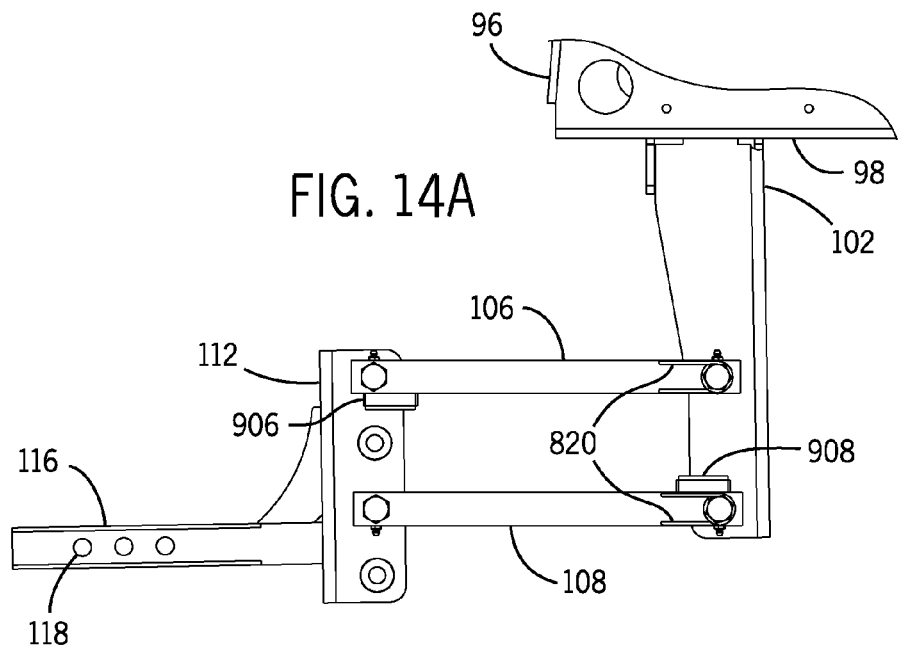

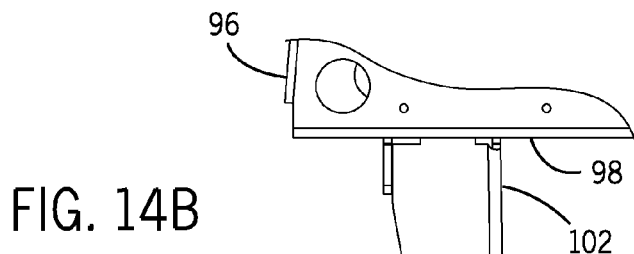
FIG. 14B
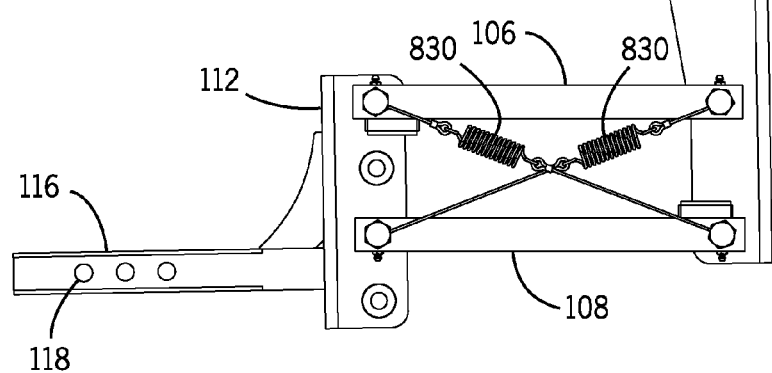
FIG. 14C
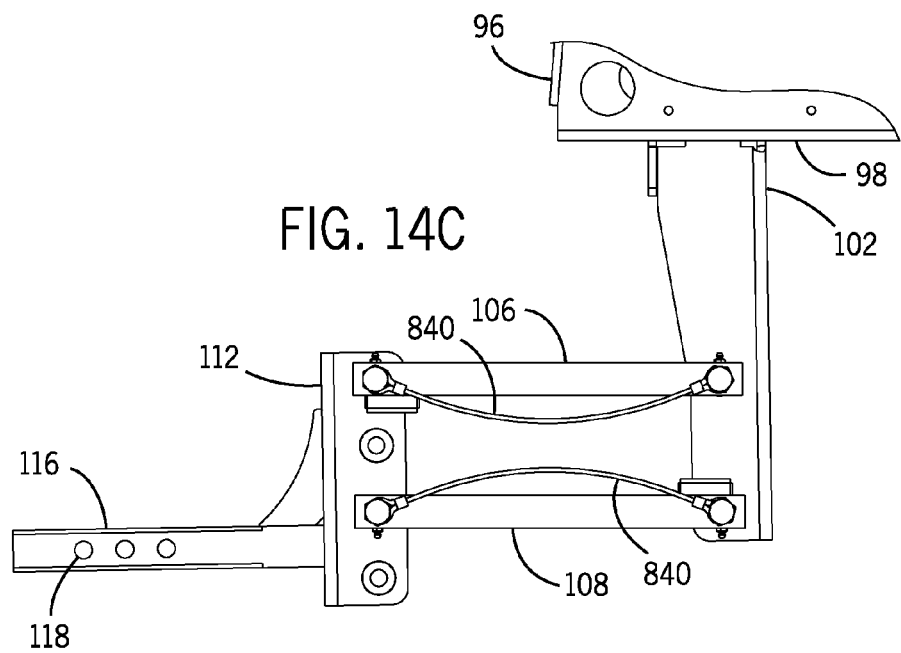

ARTICULATED HITCH COUPLER

PRIORITY CLAIM AND CROSS-REFERENCE TO RELATED APPLICATIONS

This application claims priority to and the benefit of U.S. Provisional Application No. 61/794,249, filed on Mar. 15, 2013, and U.S. Provisional Application No. 61/792,565, filed on Mar. 15, 2013, and the entire disclosure of each is incorporated herein by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to apparatus, systems, methods, techniques, etc. for coupling a motor vehicle or other pulling vehicle to a wheeled trailer or other towed cargo.

2. Description of Related Art

A variety of uses have arisen for pulling or towing a trailer or other "towed vehicle" to accompany a motor vehicle or other "towing vehicle." Hitching a towed vehicle to a towing vehicle has been accomplished by a multiplicity of different structures and techniques. In some settings it is desirable to limit the manner and range of linear and rotational displacement permitted for a towed vehicle. Apparatus, systems, methods, techniques, etc. that provide improved coupling of a towed vehicle to a towing vehicle while limiting relative movement of the two vehicles to only vertical displacement would represent a significant advancement in the art.

SUMMARY

The present invention is readily understood by the following detailed description in conjunction with the accompanying drawings. Embodiments of an articulated, self-adjusting coupler include a rotational linkage using two or more (and in some embodiments four) linkage arms that permit vertical rotational displacement of a towed vehicle relative to a towing vehicle, but otherwise prevent undesirable movement and/or stresses during use of the towed vehicle.

BRIEF DESCRIPTION OF THE DRAWINGS

The present invention will be readily understood by the following detailed description in conjunction with the accompanying drawings, wherein like reference numerals designate like structural elements.

FIG. 1 is a perspective view of a motor vehicle towing vehicle and a trailer towed vehicle coupled together using an articulated coupler according to one or more embodiments of the present invention.

FIG. 12A is a side view of an articulated hitch coupler according to one or more embodiments of the present invention wherein the trailer channel is rotated upward relative to the vehicle channel.

FIG. 12B is a side view of an articulated hitch coupler according to one or more embodiments of the present invention wherein the trailer channel is rotated downward relative to the vehicle channel.

FIG. 13C is a side view of an articulated hitch coupler according to one or more embodiments of the present invention wherein the hitching weldment comprising a draw bar and vehicle channel is in the second vertical orientation relative to the trailer channel and using different vehicle channel bushings as shown in FIG. 13A.

FIG. 14A is a side view of an articulated hitch coupler using torsion springs according to one or more embodiments of the present invention.

FIG. 14B is a side view of an articulated hitch coupler using extension springs according to one or more embodiments of the present invention.

FIG. 14C is a side view of an articulated hitch coupler using compression springs according to one or more embodiments of the present invention.

DETAILED DESCRIPTION

Figure 2A:
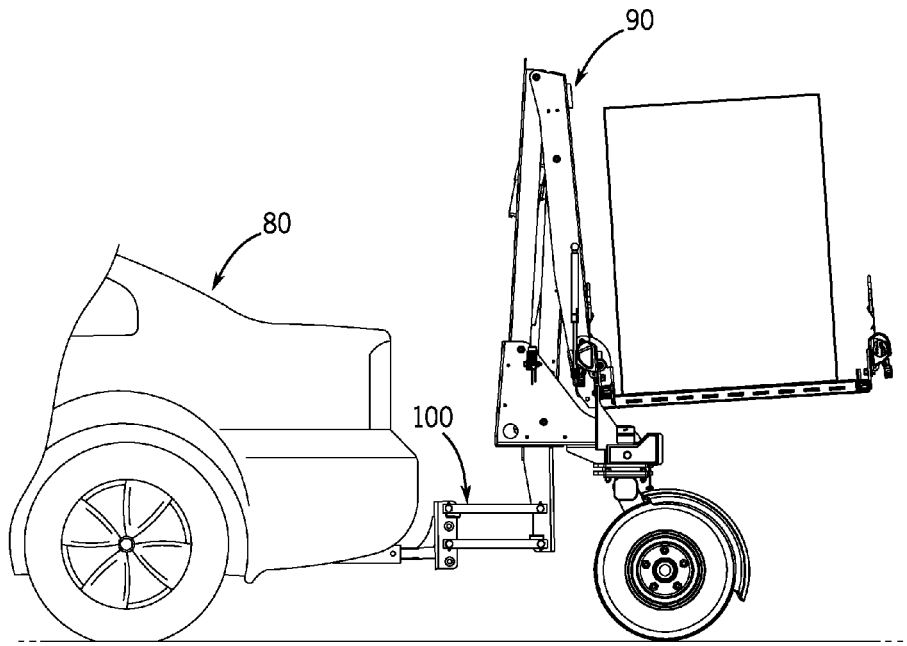
FIGS. 2A-2D are side views of a motor vehicle towing vehicle and a trailer towed vehicle coupled together using an articulated hitch coupler according to one or more embodiments of the present invention.
Figure 2B:
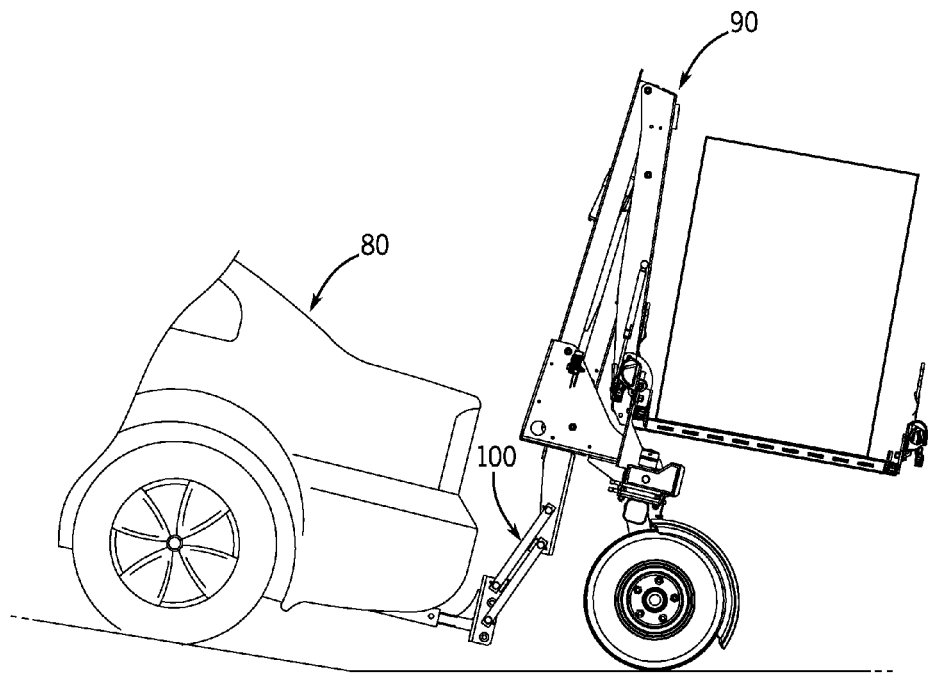

The following detailed description of the invention, including the Figures, will refer to one or more invention embodiments, but is not limited to such embodiments. Rather, the detailed description is intended only to be illustrative. Those skilled in the art will readily appreciate that the detailed description given with respect to the Figures is provided for explanatory purposes as the invention extends beyond such specific embodiments. Embodiments of the invention provide apparatus, systems, methods, techniques, etc. including and pertaining to (but not limited to) self-adjusting, articulated hitch coupling systems for connecting a towed vehicle to a towing vehicle. Other structures and uses will be apparent to those skilled in the art after considering the following disclosure and the Figures provided herewith. Embodiments of the present invention will be shown and explained primarily in connection with a coupler used to couple a motor vehicle to a trailer-based lift or the like. Some embodiments can be used in connection with other towed vehicles and towing vehicles.

The Figures illustrate one or more embodiments of a self-adjusting trailer coupler that can be used for coupling a powered towing vehicle such as an automobile, SUV, etc. to a wheeled towed vehicle such as a trailer or the like, though the present invention is not limited to only these types of towing vehicles and towed vehicles. Embodiments of the self-adjusting coupler accommodate articulation in both vertical directions relative to the towing vehicle (up and down, or + and –), that is vertical displacement of the towed vehicle up or down relative to the towing vehicle. This allows the towed vehicle to remain in an essentially identical "upright" orientation relative to the towed vehicle during vertical transitions, such as those encountered when a motor vehicle or the like ascends or descends a sloped driveway, ramp, etc. and/or when the towing vehicle and towed vehicle are on different vertical levels. Some embodiments shown in the Figures and/or described herein can accommodate shifts in the range of approximately 9 inches in each vertical displacement direction (other embodiments can accommodate shifts of up to 11 inches), though other ranges of motion can be realized with adjustments to the dimensions and other characteristics of the components of the self-adjusting, articulated hitch coupler embodiments presented herein.

Most trailer configurations provide for an extended platform or the like on which cargo can be loaded. The trailer platform typically extends well back from the rear of a towing vehicle and provides adequate surface area for distribution of cargo or orientation of a load so as to provide the center of gravity of the load or cargo over or nearly over the wheels or other supports. Thus even heavy loads do not exert inordinate torque forces on the hitching apparatus or other components other than the wheels/supports. Moreover, because the trailer platform tends to be relatively elongated, the trailer itself is not mounted too close to the towing vehicle. Weight is normally distributed on a trailer with 70% of the load situated between the towing vehicle and the towed vehicle's wheels. In some articulated hitch coupler embodiments herein, ~80% of the load (e.g., on a loaded lift platform) can sit behind the towed vehicle wheels, especially when the towed vehicle wheels are swiveled toward the towing vehicle and the lift platform is loaded. In this disclosure the terms "rearward," "behind," "frontmost," "ahead," "forward" and the like are used relative to the front and rear directions of a motor vehicle or other towing vehicle to which the articulated hitch coupler and any towed vehicle are connected.

When a trailer or other towed vehicle is considerably shorter than the typical trailer, centering of the load above the wheels/supports may not be possible. Moreover, when the trailer platform is positioned rearward of the wheels/supports, the loaded platform can in some cases exert a considerable torque force on the hitching apparatus, even for modest loads of a few hundred pounds. The challenges posed by substantial torque from such configurations can be exacerbated by the use of caster wheels or other swiveling supports that can change the length of the lever-arm.

Some embodiments of the self-adjusting coupler disclosed and claimed herein are shown in use with a trailer-mounted lift that has the above-noted characteristics—namely, swiveling wheels that are positioned between the motor vehicle hitching apparatus and a cargo platform that is completely rearward of the wheel-ground engagement axis. While such examples help to illustrate advantages of the embodiments illustrated, the present invention is not limited solely to trailers or other towed vehicles that have one or all of these characteristics.

Figure 2C:
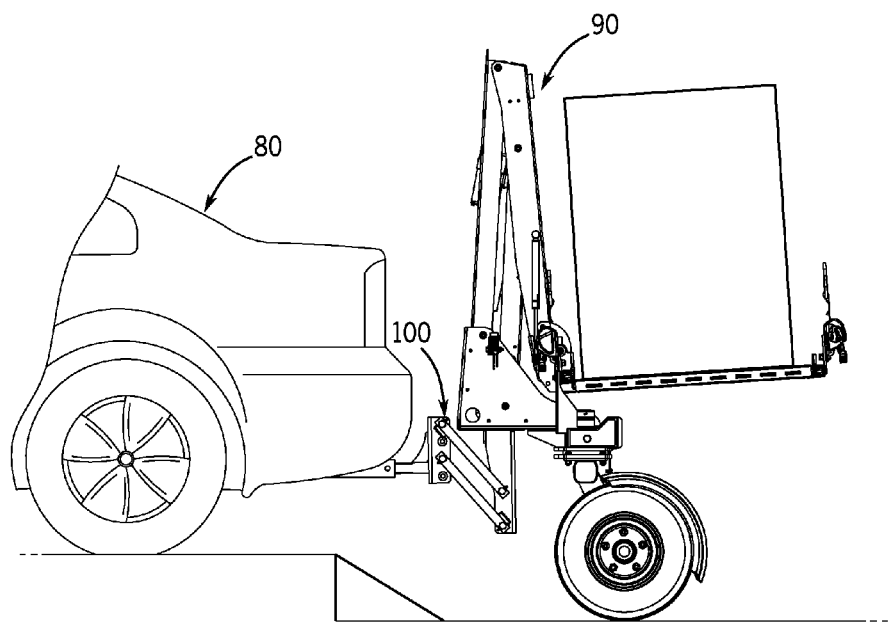
Figure 2D:
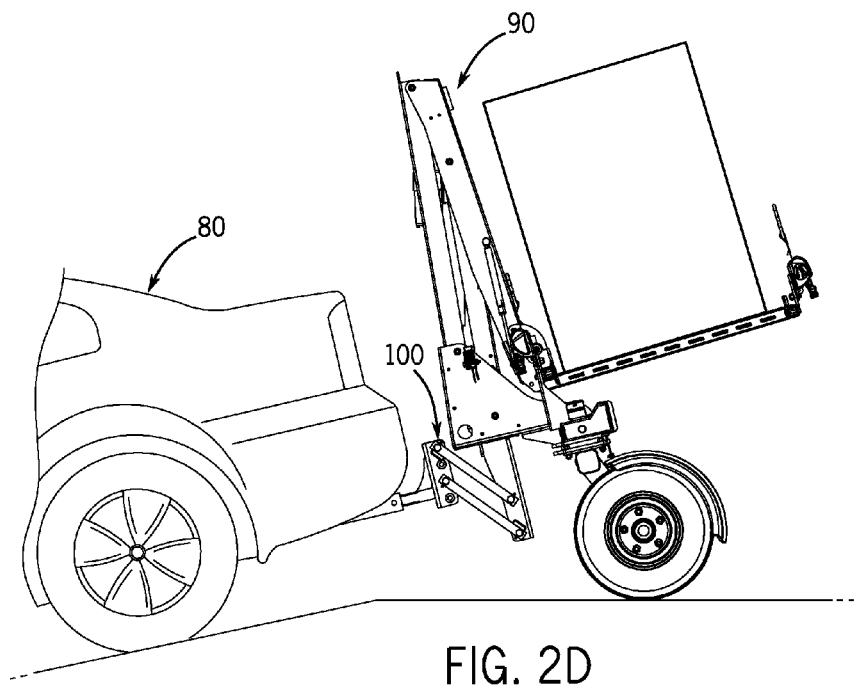
Figure 3:
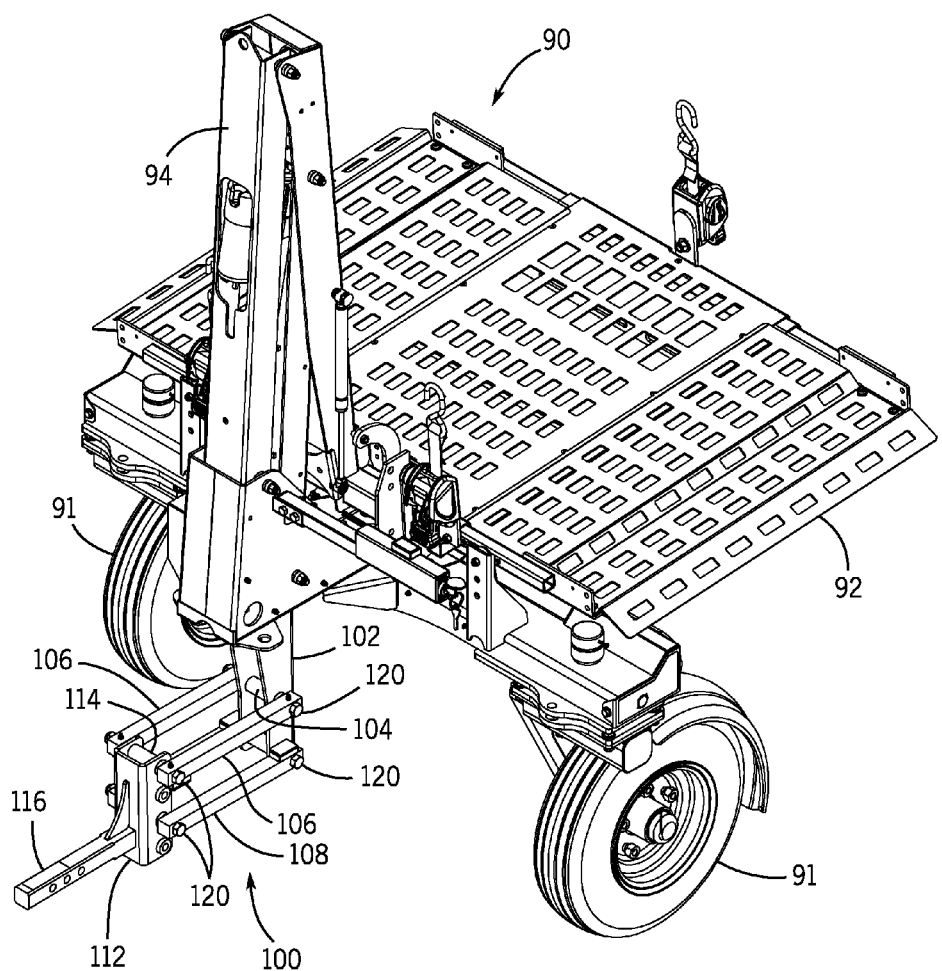
FIG. 3 is a perspective view of a trailer towed vehicle to which is mounted an articulated hitch coupler according to one or more embodiments of the present invention.
Figure 4:
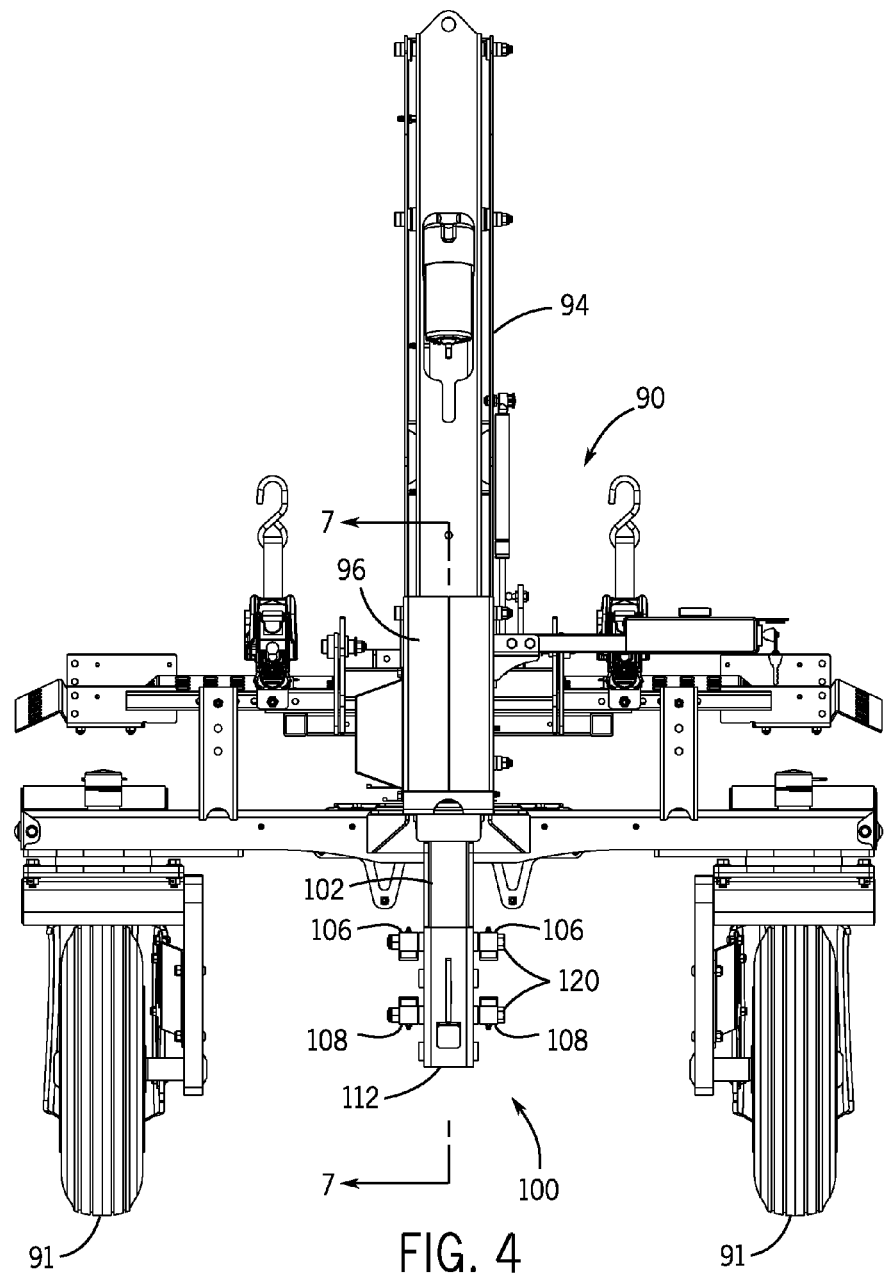
FIG. 4 is an end view of a trailer towed vehicle to which is mounted an articulated hitch coupler according to one or more embodiments of the present invention.

FIGS. 1 and 2A-2D show a motor vehicle 80 coupled to a personal mobility vehicle lift 90 using a self-adjusting, articulated towing coupler 100 that is shown in more detail in the Figures. In FIG. 2C, the towed vehicle, lift 90, is relatively lower than the towing motor vehicle 80, due to a difference in the vertical levels on which each sits. The angular relationship of motor vehicle 80 to lift 90 in FIG. 2D achieves this same type relative vertical displacement. Conversely, in FIG. 2B, towed vehicle 90 is relatively higher due to a different angular displacement.

Figure 5:
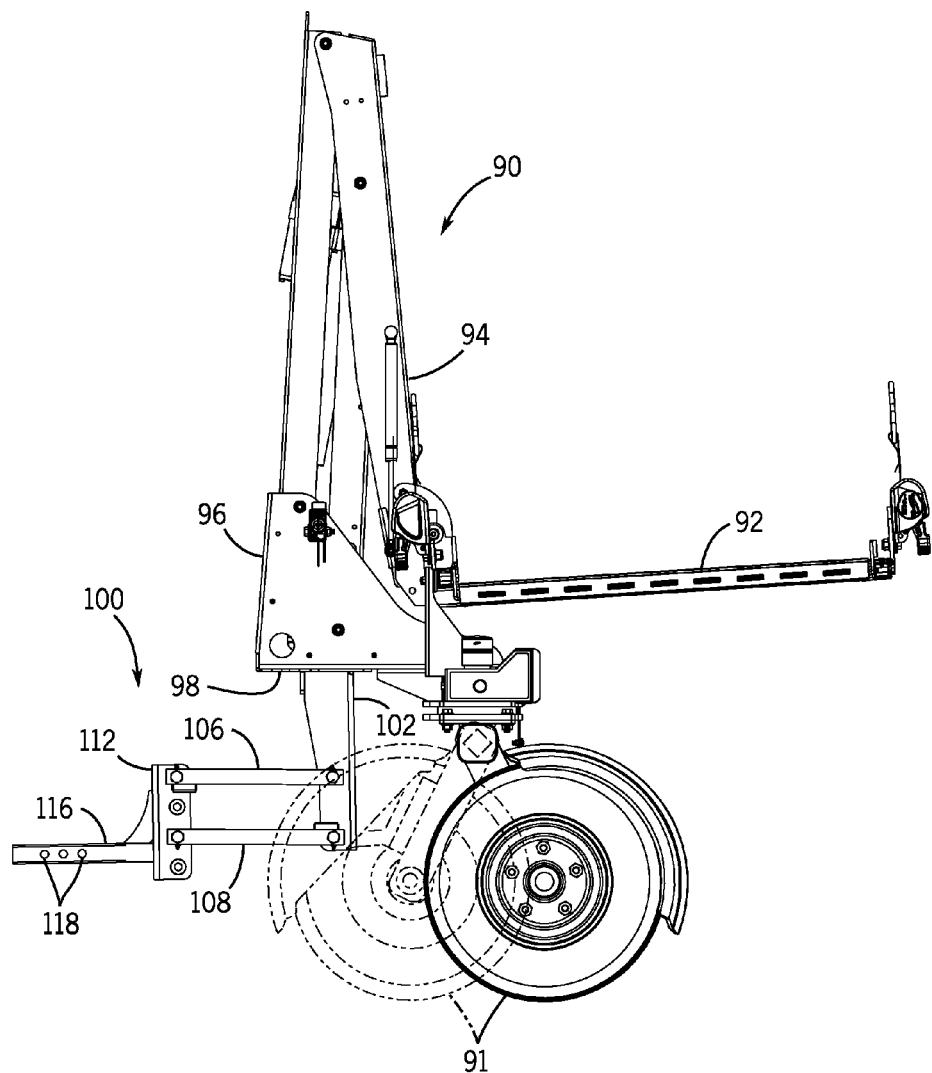
FIG. 5 is a side view of a trailer towed vehicle to which is mounted an articulated hitch coupler according to one or more embodiments of the present invention.
Figure 6:
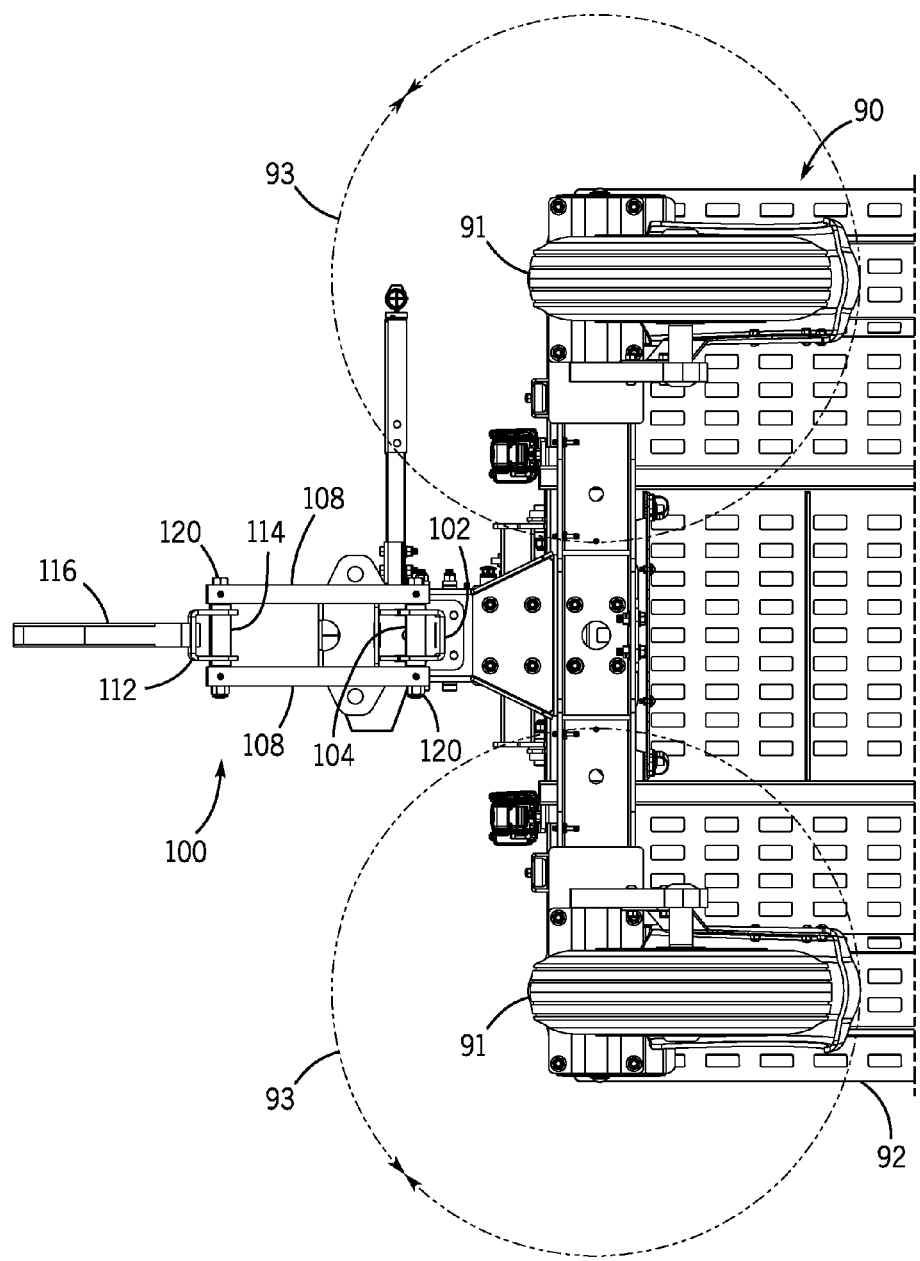
FIG. 6 is a bottom view of a trailer towed vehicle to which is mounted an articulated hitch coupler according to one or more embodiments of the present invention.
Figure 7:
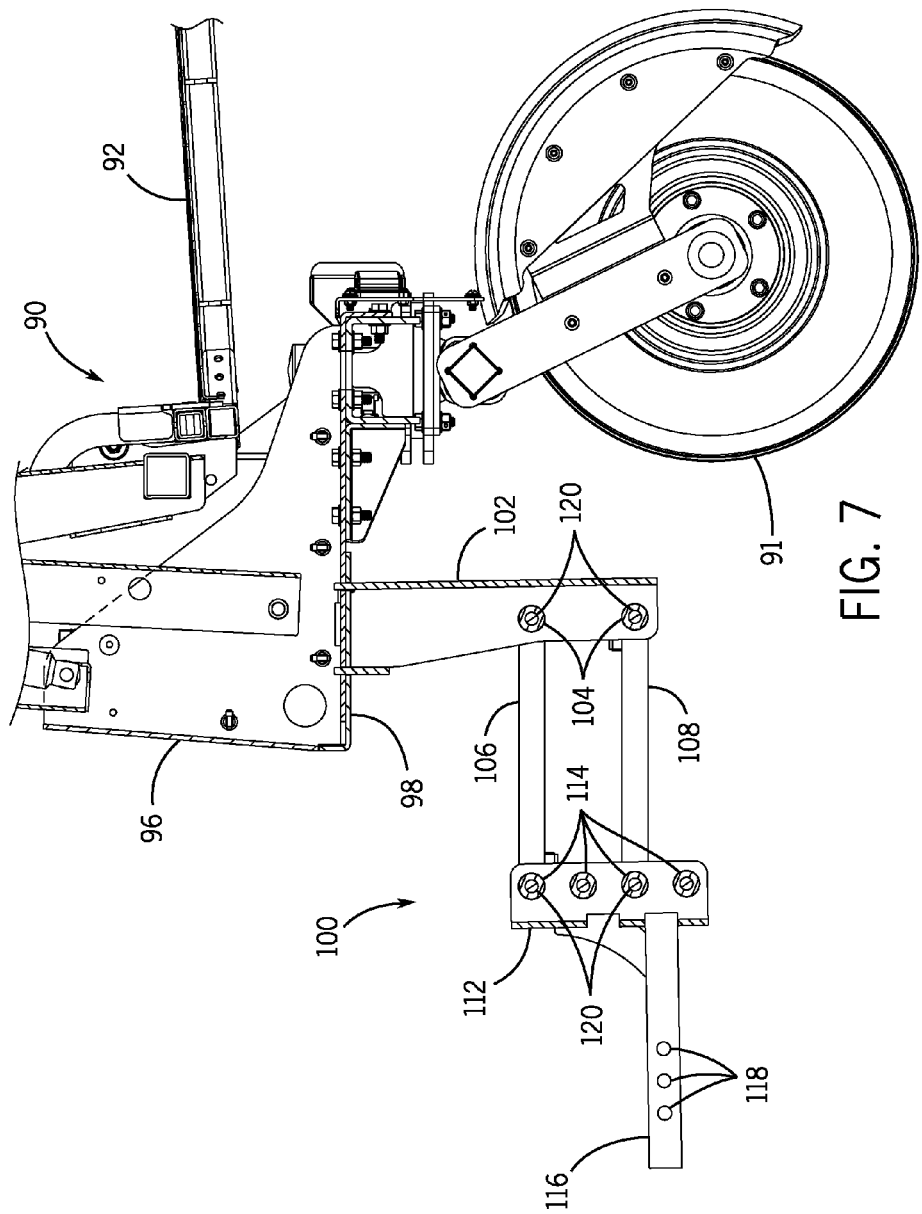
FIG. 7 is a side sectional view of a trailer towed vehicle to which is mounted an articulated hitch coupler according to one or more embodiments of the present invention.
Figure 8:
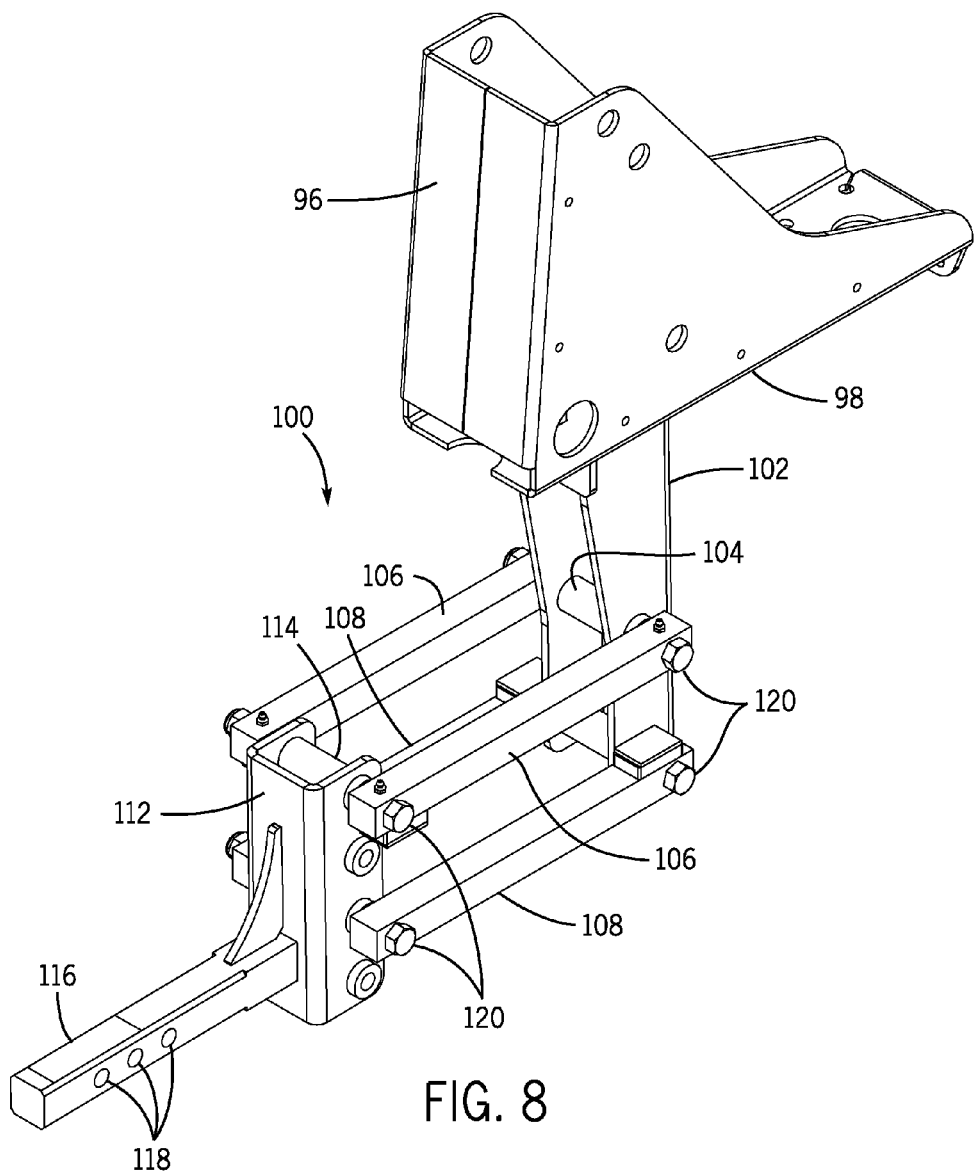
FIG. 8 is a perspective view of an articulated coupler according to one or more embodiments of the present invention.

In FIGS. 3-8, the motor vehicle 80 is not illustrated (the relative position of a towing vehicle can be determined by the location of the draw bar 116) and more detail of the coupler 100 and lift 90 is visible. Lift 90 is supported by a pair of swiveling wheels 91 (or casters) and has a generally horizontal lift platform 92 that can be raised and lowered using a powered mechanism 94. Swivel wheels 91 are shown in FIGS. 6 and 7 in their rearwardmost swivel position; that is, extending away from coupler 100 and towing vehicle 80 as far as wheels 91 can rotate. FIGS. 5 and 6 show swivel wheels 91 in various positions with the wheels pivoting as indicated by arrows 93. In FIG. 5 both wheels 91 are shown in phantom as being pivoted to their frontmost position, where the contact point of each wheel 91 with the ground is essentially ahead of the platform 92 and is generally beneath the power lifting mechanism 94. These various wheel orientations change the ways in which the lift 90 generates torque forces, especially when lift 90 is loaded with cargo, as shown in FIGS. 2A-2D. Lift mechanism 94 is mounted to a lift chassis 96 that has a generally planar, horizontal lower plate 98.

As seen in the Figures, a generally vertical trailer channel 102 that is part of a towed vehicle unit is affixed to the underside of plate 98, for example by welding or any other suitable means. The platform 92 is viewed, relative to a motor vehicle 80 or the like, as extending "rearward" in the Figures (that is, the lift 90 is rearward of motor vehicle 80). This forward/rearward orientation, as defined and noted above, will be used to describe other aspects of embodiments of the present invention.

Figure 11A:
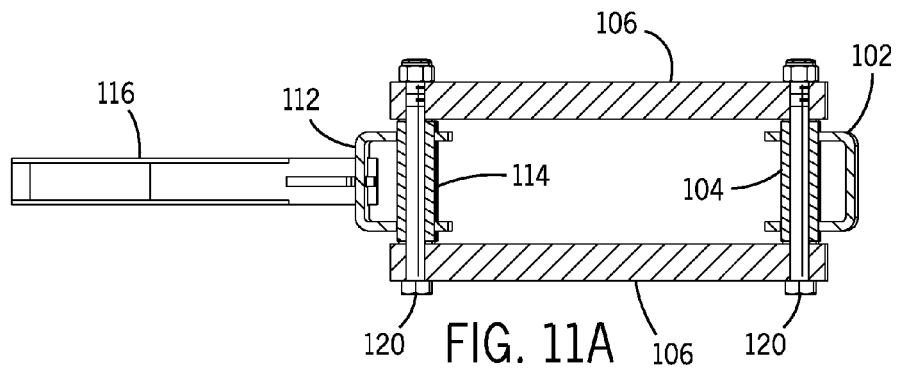
FIG. 11A is a top cross-sectional view of an articulated coupler using solid bars as linkage arms according to one or more embodiments of the present invention, taken along the line 11-11 of FIG. 10.
Figure 11B:
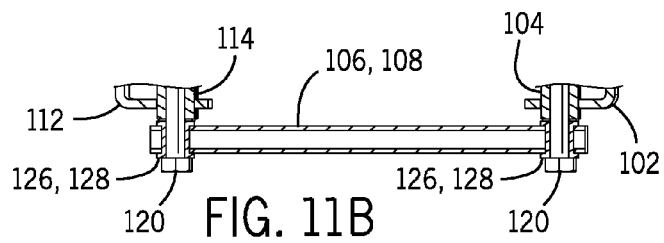
FIG. 11B is a partial top cross-sectional view of an articulated hitch coupler using tubes as linkage arms according to one or more embodiments of the present invention, taken along the line 11-11 of FIG. 10.

In the Figures, trailer channel 102 of coupler 100 can be constructed from formed steel plate or the like and has a generally vertical channel that opens "forward" toward the motor vehicle or other device to which lift 90 is coupled. The trailer channel 102 can include 2 or more bushings 104 that are mounted across the vertical channel, as seen in the Figures. In some embodiments more than 2 bushings 104 can be mounted in trailer channel 102 to provide adjustable mounting configurations, as discussed in more detail below. The bushings 104 are steel tubes or other structures configured to permit free rotation of two pairs of linkage arms 106, 108 that are rotatably coupled to various bushings in coupler 100. Coupler 100 is shown in its "neutral" position in FIGS. 2A and 5, wherein the linkage arms 106, 108 are in the positions they hold when the towed vehicle 90 and the towing vehicle 80 have no relative vertical displacement from one another. Each arm 106 of a pair of upper linkage arms 106 is rotatably mounted to an upper trailer channel bushing 104 on the outside of trailer channel 102. Similarly, each arm 108 of a pair of bottom linkage arms 108 is rotatably mounted to a trailer channel bushing 104 on the outside of trailer channel 102 below the mounting points of upper arms 106. Each linkage arm 106, 108 can be constructed of appropriate material(s), e.g. being made of solid steel bar material, steel tubing, etc. The upper linkage arms 106 define an upper linkage arm plane and the lower linkage arms 108 define a lower linkage arm plane, the upper and lower linkage arm planes being parallel in some embodiments and non-parallel in other embodiments. Fewer than or more than four linkage arms can be used in other embodiments, being mounted to additional bushings, directly to the vehicle and trailer channels or the like as needed. Linkage arms 106, 108 are mounted to bushings 104 using bolts 120. If steel tubes are used as linkage arms, then bushings can be used in the linkage arms (details of linkage arm bushings 126, 128 can be seen in FIG. 11B, for example). In some embodiments the bolts and linkage arms 106, 108 (or bushings, if the linkage arms are tubes) can be treated with an appropriate lubricant (e.g., grease, zerk fittings, or the like) and/or be constructed of materials that permit very low friction engagement and rotation of bolts 120 within each bushing 104, 114.

Despite the relatively free rotation of the linkage arms 106, 108 relative to the vehicle channel 112 and trailer channel 102, the use of bushings 104, 114 and bolts 120 provides a rigid, stable box-like structure that does not permit undesirable angular displacement of the towed vehicle relative to the towing vehicle (for example in the form of a wobble or wagging of the towed vehicle or in the form of jackknifing of the towed vehicle during backing up of the towing vehicle). The horizontally (laterally) rigid configuration of coupler 100 in tandem with the use of swiveling wheels 91 on the towed vehicle make short towed vehicles like lift 90 more easy to maneuver and less susceptible to problems caused by ball hitches and other configurations that permit such horizontal angular displacement. Moreover, as noted below, embodiments of the articulated hitch coupler 100 herein convert a vertically and horizontally rigid mortise and tenon hitch structure into a coupling that accommodates substantial vertical displacement of the towed vehicle relative to the towing vehicle.

The opposing ends of linkage arms 106, 108 are rotatably mounted to upper and lower vehicle channel bushings 114 on the outside of a vehicle channel 112. Vehicle channel 112 is part of a towing vehicle unit and is similar in construction to trailer channel 102, for example being constructed of formed steel plate and having 2 or more steel bushings 114 mounted inside the rearward-open channel. Vehicle channel 112 can be welded (or otherwise affixed) to a towing vehicle hitching structure such as a draw bar 116 that has a plurality of adjustment holes 118 for mounting the draw bar 116 to a motor vehicle hitch receiver or the like. The embodiments of the coupler 100 herein allow a user to convert a standard, rigid mortise and tenon type of hitch configuration into a hitch that provides substantial vertical displacement of the towed vehicle relative to the towing vehicle while preventing horizontal angular displacement that comes with use of a standard ball hitch or the like. Other motor vehicle mounting configurations can be used, depending upon the type of towing vehicle and any mounting structures thereon. Moreover, various hitches (e.g., class I, II or III hitches) can be accommodated using an interchangeable draw bar weldment that is easy to swap when the towed vehicle is going to be hitched to a different towing vehicle. Additional details of the coupler 100 can be seen in the various exploded view of coupler 100.

Rotatable securing of arms 106, 108 and bolts 120 to the trailer channel 102 and vehicle channel 112 can be accomplished by various means including bolts, axles, pins, or the like. In the Figures, bolts 120 are used in connection with washers and nuts to securely mount arms 106, 108 to the trailer channel 102 and vehicle channel 112 while also allowing easy adjustment of the mounting as well as transfer of the towed vehicle 90 to a different towing vehicle that might have a different vertical profile.

Using embodiments of the articulated hitch coupler disclosed herein, coupler 100 allows for rotation in both upward and downward directions, like a trailer hitch ball, while preventing lateral rotation (i.e., about a vertical axis, like the yaw of an aircraft) and twisting (i.e., about a front-to-back horizontal axis, like the roll of an aircraft). Moreover, the four linkage arms provide a rigid bracing that prevents substantial linear displacement (though some minor front-to-back linear displacement naturally results due to the vertical rotation of the arms 106, 108). Vertical displacement of the towed vehicle relative to the towing vehicle can be seen in the detailed illustrations of coupler 100 in FIGS. 12A and 12B, showing substantial upward and downward movement of trailer channel 102 relative to vehicle channel 112 for one or more embodiments of the coupler.

Figure 9:
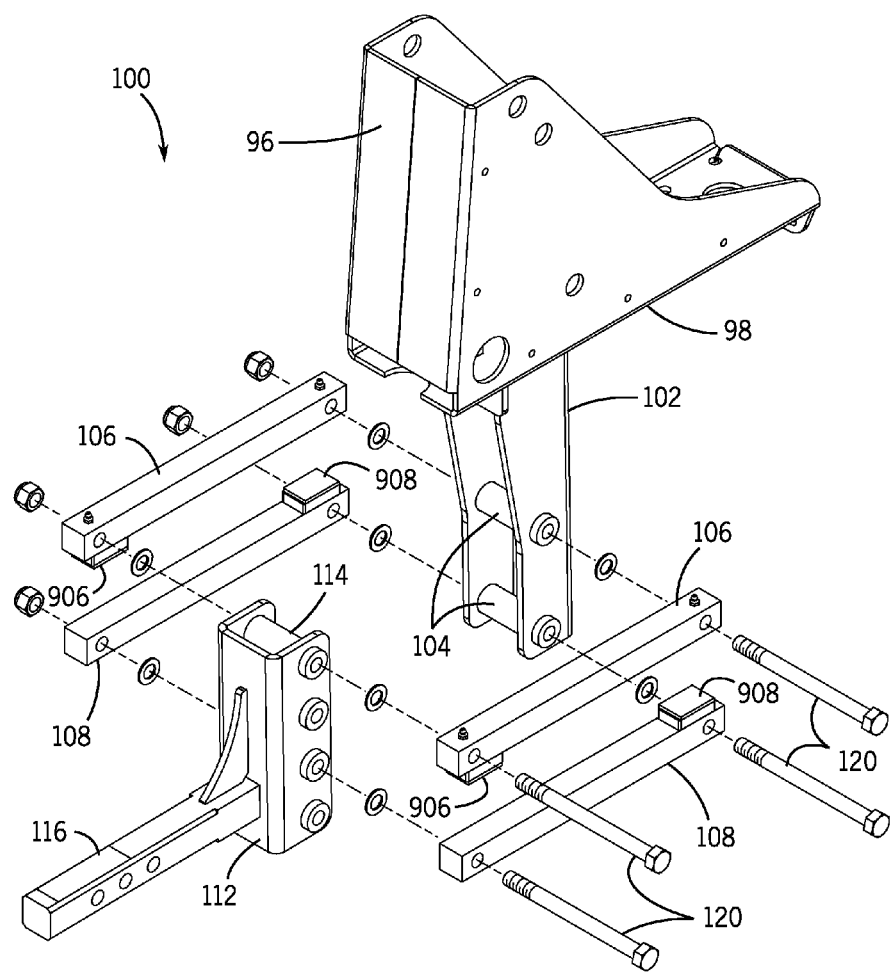
FIG. 9 is an exploded view of an articulated coupler according to one or more embodiments of the present invention.
Figure 10:
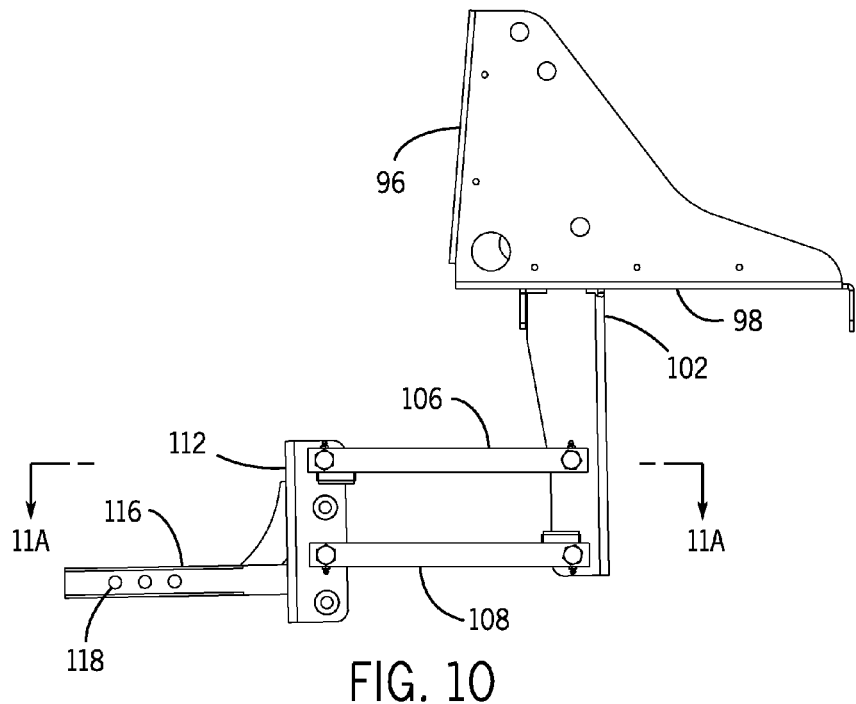
FIG. 10 is a side view of an articulated coupler according to one or more embodiments of the present invention.

Over-rotation of the linkage arms can be prevented in some embodiments by employing mechanical stops 906, 908 on the linkage arms 106, 108 as shown in FIGS. 9, 12A and 12B. Each stop 906, 908 can be a small rectangular piece of formed steel or the like with a suitable surface, such as a polymer or other material to prevent metal-on-metal damage and wear when a stop 906, 908 engages an opposing linkage arm 108, 106, as seen in FIG. 12A, where the trailer channel 102 has rotated to its full upward extent relative to vehicle channel 112. In the embodiments illustrated, one stop is used on each linkage arm; however, multiple stops can be used on linkage arm to achieve desired performance characteristics for the articulated hitch coupler. In addition to preventing damage and wear, stops 906, 908 can be used to prevent locking of the articulated hitch coupler in such maximum displacement positions.

The geometry of the four linkage arm arrangement can be configured to offset any inherent tendencies of a towed vehicle to rotate forward and/or rearward. In one scenario, when a load is removed from the towed vehicle, the center of gravity of the towed vehicle shifts toward the towing vehicle while the wheels (or other supports) define a fulcrum axis. The result is a tendency for the towed vehicle 90 to tilt toward the towing vehicle, that is for the upper part of lift 90 to rotate forward toward the towing vehicle 80. Likewise, when the platform 92 of the towed vehicle 90 is loaded, the center of gravity shifts away from the towing vehicle 80 (again with the towed vehicle's supports, e.g. wheels, defining a fulcrum axis), creating a tendency for the upper part of the towed vehicle 90 to tilt away from the towing vehicle, that is to rotate rearward.

Some articulated hitch coupler embodiments use linkage arms 106, 108 that are all parallel to one another, creating a parallelogram 4-bar linkage. However, parallel linkage arm configurations can lead to the lift 90 or other towed vehicle rotating toward or away from a towing vehicle, especially when the towed vehicle is relatively short and has a weight-bearing platform 92 or other structure that tends to affect torsional forces substantially. Some embodiments of the articulated coupler thus utilize non-parallel mounting of the arms 106, 108, as discussed in more detail below.

The Figures illustrate wheel positions in which both wheels 91 are fully swiveled forward, toward the towing vehicle 80. Other relative orientations of the wheels can occur, for example (a) an orientation in which one wheel is rotated 90° "outboard" while the other wheel remains rotated to the rear, under platform 92, (b) an orientation in which one wheel is rotated 90° "outboard" while the other wheel is swiveled forward, or (c) an orientation in which one wheel is rotated fully forward while the other wheel is rotated fully rearward. These different orientations illustrate the changing fulcrum axis defined by the locations at which the wheels engage the ground. Those skilled in the art will recognize that these different orientations lead to different weight distributions and resulting torque characteristics that depend on wheel position and the degree to which platform 92 is loaded. The swiveling of wheels 91 provides improved maneuverability of the towed vehicle 90, but it can lead to relatively extreme weight distribution variations and other issues that are not typically encountered with traditional trailer configurations.

In some embodiments of an articulated hitch coupler, unequal spacing between rotation axes of the linkage arms 106, 108 can be used to counteract the inherent tendencies of a towed vehicle 90 to rotate toward or away from the towing vehicle 80. One such example of such unequal spacing can include use of non-parallel linkage arms mounted between vehicle channel bushings and trailer channel bushings to create a slightly non-parallel orientation (e.g., out of parallel by 1° to 2°), which can allow the draw bar to move several degrees in a counteracting orientation, depending on whether the lift or other towed vehicle is tending to rotate toward or away from the towing vehicle. Alternate dimensional and related aspects of this type of configuration can be employed as well to provide longer or shorter linkage arms, greater vertical displacement capability, etc. The fulcrum axis of any torque forces generated by cargo on a lift is defined by the where the trailer wheels engage the ground and the non-parallel linkage arm orientation can counteract the tendency of the end of a draw bar up or down.

As seen in FIGS. 14A, 14B and 14C, to assist the coupler linkage arms 106, 108 in returning to and maintaining their neutral orientation, one or more springs or other biasing elements can be used. In FIG. 14A a torsion spring 820 can be mounted at one or more of the pivotably mounted ends of arms 106, 108. Each torsion spring 820 can be dual-directed. In FIG. 14B, diagonally mounted extension springs 830 can be used as well —the springs 830 can be replaced in this configuration by dual acting counterbalance gas type springs, too. Finally, in FIG. 14C, compression spring 840 can be mounted so that the spring 840 compress as the linkage arms 106 and 108 get closer together. Such spring or other biasing member configurations help prevent the articulated coupler 100 from locking in a non-neutral position, especially when the coupler linkage arms are in one of the more extreme positions due to substantial vertical displacement between the towed vehicle and the towing vehicle.

Figure 13A:
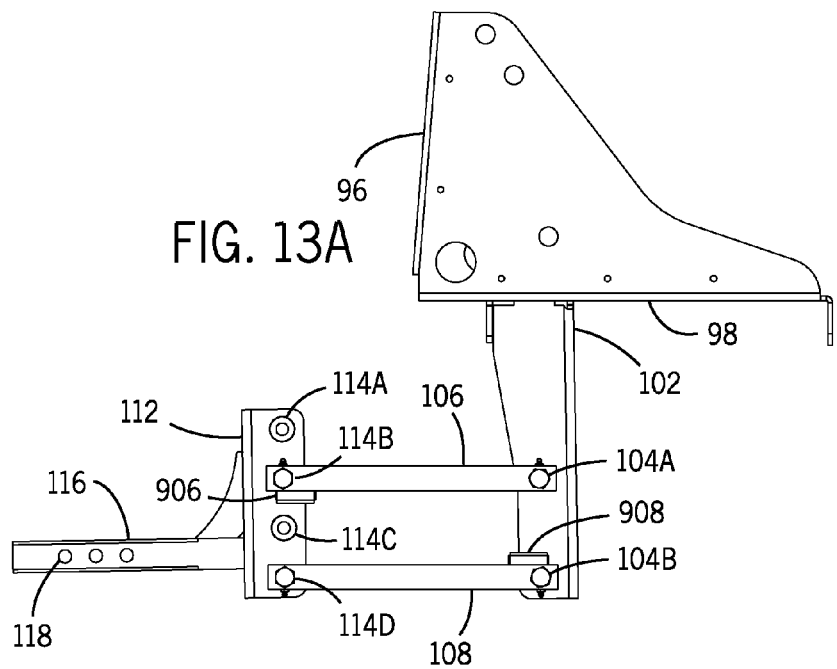
FIG. 13A is a side view of an articulated hitch coupler according to one or more embodiments of the present invention wherein the hitching weldment comprising a draw bar and vehicle channel is in a first vertical orientation relative to the trailer channel.
Figure 13B:
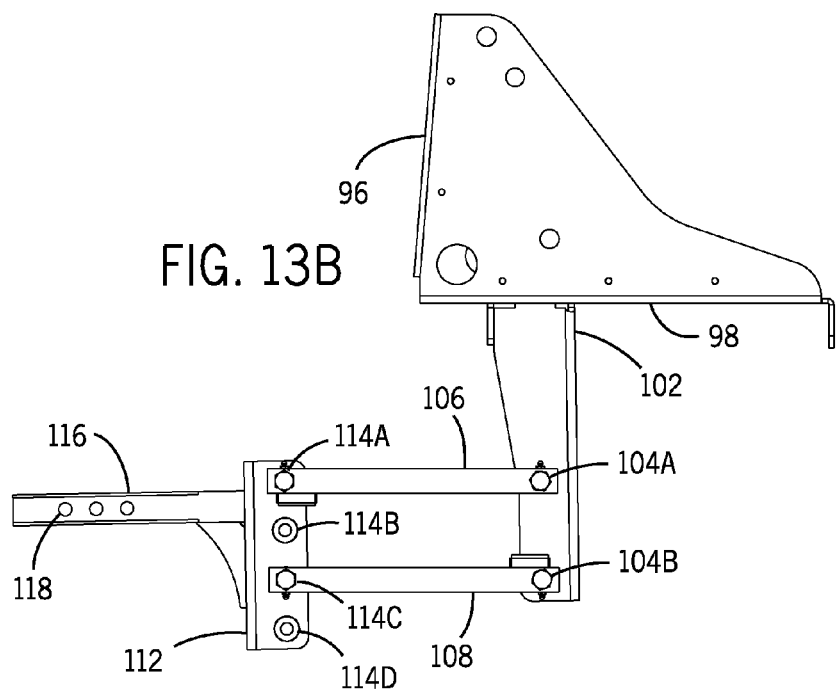
FIG. 13B is a side view of an articulated hitch coupler according to one or more embodiments of the present invention wherein the hitching weldment comprising a draw bar and vehicle channel is in a second vertical orientation relative to the trailer channel and using the same vehicle channel bushings as shown in FIG. 13A.

Embodiments of the articulated hitch coupler shown in one or more of the Figures also provide a versatile mounting arrangement to accommodate differing vertical profiles for a wide variety of towed vehicles and towing vehicles. For example, the hitching weldment of the draw bar 116 and vehicle channel 112 can be rotated 180° as seen in FIGS. 13B and 13C, thus changing the height and mounting positions of four bushings 114A, 114B, 114C and 114D. In FIG. 13B, bushings 114A and 114C are used to mount link arms 106, 108, respectively, to trailer channel bushings 104A and 104B. In FIG. 13C, a slightly lower vertical mounting is achieved when bushings 114B and 114D are used instead. When the draw bar/vehicle channel hitching weldment is rotated 180° as seen in FIG. 13A, bushings 114A-D are in different positions and thus permit another set of vertical profile mounting arrangements with trailer channel bushings 104A and 104B.

Other configurations and embodiments are included in the articulated hitch coupler disclosed herein. For example, one embodiment uses only a single upper linkage arm 106 and a single lower linkage arm 108 that are rotatably held inside the trailer channel 102 and vehicle channel 112 by appropriate means. This embodiment maintains horizontal/lateral stability and rigidity by employing a bolt 120 or similar securing means as well as using the side walls of the vehicle and trailer channels to prevent horizontal/lateral angular or other undesired displacement. The side views of the four linkage arm embodiments also depict the two linkage arm embodiments, with the exception that the ends of arms 106, 108 would not be visible outside the vehicle and trailer channels from such side views. Again, the dimensions, materials and other characteristics of such an embodiment can be adjusted to achieve desired performance from such an articulated coupler.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. An articulated hitch coupler comprising:
   a vehicle channel secured to a towing vehicle hitching structure, the vehicle channel comprising an upper vehicle channel bushing and a lower vehicle channel bushing mounted in the vehicle channel;
   a trailer channel configured to be secured to a towed vehicle, the trailer channel comprising an upper trailer channel bushing and a lower trailer channel bushing mounted in the trailer channel;
   coupling means for coupling the towing vehicle unit to the towed vehicle unit, the coupling means comprising a plurality of linkage arms pivotably coupling the upper and lower vehicle channel bushings to the upper and lower trailer channel bushings, the plurality of linkage arms comprising:
      a first upper linkage arm having a first end pivotably coupled to the upper vehicle channel bushing and having a second end pivotably coupled to the upper trailer channel bushing;
      a first lower linkage arm having a first end pivotably coupled to the lower vehicle channel bushing and having a second end pivotably coupled to the lower trailer channel bushing;
      a second upper linkage arm having a first end pivotably coupled to the upper vehicle channel bushing and having a second end pivotably coupled to the upper trailer channel bushing; and
      a second lower linkage arm having a first end pivotably coupled to the lower vehicle channel bushing and having a second end pivotably coupled to the lower trailer channel bushing;

wherein the first and second upper linkage arms are mounted on opposing external sides of the trailer channel and opposing external sides of the vehicle channel;

further wherein the first and second lower linkage arms are mounted on opposing external sides of the trailer channel and opposing external sides of the vehicle channel;

further wherein the first and second upper arms are parallel to one another; further wherein the first and second lower arms are parallel to one another; and further wherein the first upper arm is parallel to the first lower arm;

further wherein the coupling means is configured to permit vertical displacement of the trailer channel relative to the vehicle channel and further wherein the coupling means is configured to prevent lateral angular displacement of the trailer channel relative to the vehicle channel; and a biasing element mounted to the coupler and configured to resist vertical displacement of the trailer channel relative to the vehicle channel.

2. The articulated hitch coupler of claim 1 wherein each linkage arm is pivotably bolted inside the trailer channel and inside the vehicle channel.

3. The articulated hitch coupler of claim 1 further comprising a hitching weldment comprising a draw bar welded to the vehicle channel, wherein the hitching structure comprises the draw bar, and further wherein the hitching weldment is vertically reversible.

4. The articulated hitch coupler of claim 1 wherein each linkage arm comprises a mechanical stop configured to limit linkage arm rotation.

5. An articulated hitch coupler comprising:

a towing vehicle unit comprising a vehicle channel welded to a draw bar, the vehicle channel comprising an upper vehicle channel bushing mounted in the vehicle channel and a lower vehicle channel bushing mounted in the vehicle channel;

a towed vehicle unit comprising a trailer channel configured to be secured to a towed vehicle, the trailer channel comprising an upper trailer channel bushing mounted in the trailer channel and a lower trailer channel bushing mounted in the trailer channel;

coupling means for coupling the towing vehicle unit to the towed vehicle unit, the coupling means comprising four linkage arms comprising:

a first upper arm having a first end pivotably coupled to the upper vehicle channel bushing and having a second end pivotably coupled to the upper trailer channel bushing;

a second upper arm having a first end pivotably coupled to the upper vehicle channel bushing and having a second end pivotably coupled to the upper trailer channel bushing;

a first lower arm having a first end pivotably coupled to the lower vehicle channel bushing and having a second end pivotably coupled to the lower trailer channel bushing; and a second lower arm having a first end pivotably coupled to the lower vehicle channel bushing and having a second end pivotably coupled to the lower trailer channel bushing; and biasing means mounted to the coupling means and configured to resist vertical displacement of the trailer channel relative to the vehicle channel;

wherein the coupling means is configured to permit vertical displacement of the trailer channel relative to the vehicle channel and prevent lateral angular displacement of the trailer channel relative to the vehicle channel.

6. The articulated hitch coupler of claim 5 wherein the first and second upper arms comprise steel bars mounted on opposing external sides of the trailer channel and opposing external sides of the vehicle channel; further wherein the first and second lower arms comprise steel bars mounted on opposing external sides of the trailer channel and opposing external sides of the vehicle channel.

7. The articulated hitch coupler of claim 6 wherein each linkage arm coupling to a bushing comprises a bolt permitting rotation of the linkage arm relative to the bushing to which it is pivotably coupled.

8. The articulated hitch coupler of claim 7 wherein the first and second upper arms are parallel to one another; further wherein the first and second lower arms are parallel to one another; and further wherein the first upper arm is parallel to the first lower arm.

9. The articulated hitch coupler of claim 5 wherein the biasing means comprises one or more springs mounted to the coupling means to resist vertical displacement of the trailer channel relative to the vehicle channel.

10. The articulated hitch coupler of claim 5 wherein the vehicle unit is configured to be rotated 180° to provide multiple height and mounting positions of the vehicle channel relative to the trailer channel.

11. The articulated hitch coupler of claim 10 wherein the vehicle channel further comprises third and fourth bushings mounted in the vehicle channel to provide alternative coupling options for the linkage arms.

12. The articulated hitch coupler of claim 5 wherein the towed vehicle unit comprises pivoting ground-engaging wheels or casters below a cargo platform.

13. The articulated hitch coupler of claim 5 wherein each linkage arm comprises a mechanical stop configured to limit linkage arm rotation.

14. An articulated hitch coupler comprising:

a vehicle channel secured to a towing vehicle hitching structure, wherein the hitching structure comprises a draw bar welded to the vehicle channel, the vehicle channel comprising an upper vehicle channel bushing mounted in the vehicle channel and a lower vehicle channel bushing mounted in the vehicle channel;

a trailer channel configured to be secured to a towed vehicle, the trailer channel comprising an upper trailer channel bushing mounted in the trailer channel and a lower trailer channel bushing mounted in the trailer channel;

coupling means for coupling the vehicle channel to the trailer channel, the coupling means comprising four linkage arms comprising:

a first upper arm having a first end pivotably coupled to the upper vehicle channel bushing and having a second end pivotably coupled to the upper trailer channel bushing;

a second upper arm having a first end pivotably coupled to the upper vehicle channel bushing and having a second end pivotably coupled to the upper trailer channel bushing;

a first lower arm having a first end pivotably coupled to the lower vehicle channel bushing and having a second end pivotably coupled to the lower trailer channel bushing; and a second lower arm having a first end pivotably coupled to the lower vehicle channel bushing and having a second end pivotably coupled to the lower trailer channel bushing;
wherein each linkage arm coupling to a bushing comprises a bolt permitting rotation of the linkage arm relative to the bushing to which it is coupled; and biasing means mounted to the coupling means and configured to resist vertical displacement of the trailer channel relative to the vehicle channel;

wherein the first and second upper arms comprise steel bars mounted on opposing external sides of the trailer channel and opposing external sides of the vehicle channel;

further wherein the first and second lower arms comprise steel bars mounted on opposing external sides of the trailer channel and opposing external sides of the vehicle channel; and further wherein the coupling means is configured to permit vertical displacement of the trailer channel relative to the vehicle channel and prevent lateral angular displacement of the trailer channel relative to the vehicle channel.

* * * * *